(12) United States Patent
Mochida et al.

(10) Patent No.: US 8,629,653 B2
(45) Date of Patent: Jan. 14, 2014

(54) ELECTRONIC APPARATUS AND ELECTRONIC APPARATUS CHARGING SYSTEM

(75) Inventors: Norihito Mochida, Kanagawa (JP); Haruo Hayakawa, Kanagawa (JP); Masanori Oshimi, Tokyo (JP); Hidehiko Yamada, Kanagawa (JP)

(73) Assignee: Panasonic Corporation, Osaka (JP)

( * ) Notice: Subject to any disclaimer, the term of this patent is extended or adjusted under 35 U.S.C. 154(b) by 322 days.

(21) Appl. No.: 13/254,149

(22) PCT Filed: Oct. 21, 2009

(86) PCT No.: PCT/JP2009/005530
§ 371 (c)(1),
(2), (4) Date: Aug. 31, 2011

(87) PCT Pub. No.: WO2010/100690
PCT Pub. Date: Sep. 10, 2010

(65) Prior Publication Data
US 2011/0309792 A1 Dec. 22, 2011

(30) Foreign Application Priority Data
Mar. 5, 2009 (JP) .................................. 2009-052055

(51) Int. Cl.
*H01M 10/46* (2006.01)

(52) U.S. Cl.
USPC .......................................................... 320/108

(58) Field of Classification Search
USPC .................................. 320/107, 108, 114, 115
See application file for complete search history.

(56) References Cited

U.S. PATENT DOCUMENTS

| 7,051,933 | B1 | 5/2006 | Nagaoka et al. |
| 7,376,449 | B2 | 5/2008 | Mizuta et al. |
| 7,715,187 | B2 * | 5/2010 | Hotelling et al. ............. 320/108 |
| 7,860,540 | B2 | 12/2010 | Mizuta et al. |
| 2004/0245348 | A1 | 12/2004 | Nagaoka et al. |
| 2009/0061768 | A1 | 3/2009 | Simada |

FOREIGN PATENT DOCUMENTS

| JP | 2000076399 A | 3/2000 |
| JP | 2000194812 A | 7/2000 |
| JP | 2003179678 A | 6/2003 |
| JP | 2003189146 A | 7/2003 |
| JP | 2006295469 A | 10/2006 |
| JP | 2008199331 A | 8/2008 |
| JP | 2008206295 A | 9/2008 |

OTHER PUBLICATIONS

International Search Report, mailed Jan. 12, 2010, for PCT/JP2009/005530, 2 pages.

* cited by examiner

*Primary Examiner* — Edward Tso
(74) *Attorney, Agent, or Firm* — Seed IP Law Group PLLC

(57) ABSTRACT

An electronic apparatus includes a housing having a predetermined face; a power receiver that receives electric power in a contactless manner by way of the predetermined face; a secondary battery that is charged by electric power received by the power receiver; a front-back detection unit that detects whether or not the predetermined face faces a charger; and an alarm unit that notifies that the predetermined face is situated at a position inappropriate for charging when the front-back detection unit detects that the predetermined face does not face the charger.

10 Claims, 10 Drawing Sheets

FIG.3
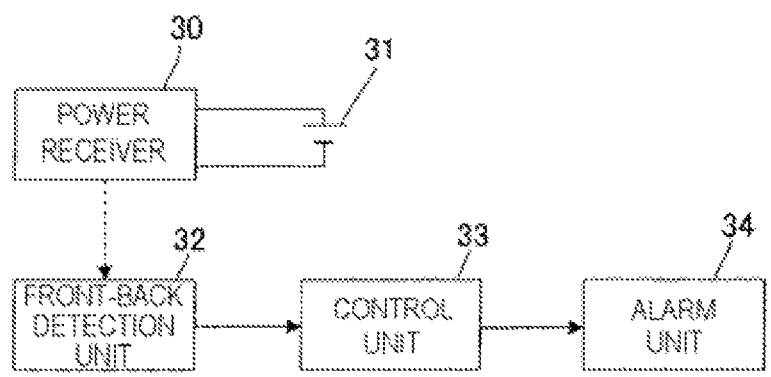
FIG.4
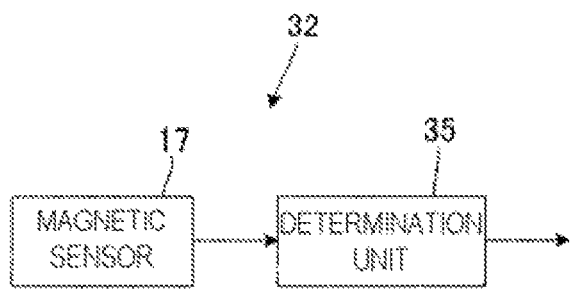
FIG.5
| | FRONT-SIDE DETERMINATION | BACK-SIDE DETERMINATION |
|---|---|---|
| MAGNETIC SENSOR 17 | H | L |

FIG.11
| | FRONT-SIDE DETERMINATION | BACK-SIDE DETERMINATION | WITHOUT MOUNT |
|---|---|---|---|
| MAGNETIC SENSOR 17A | H | L | L |
| MAGNETIC SENSOR 17B | L | H | L |
FIG.12
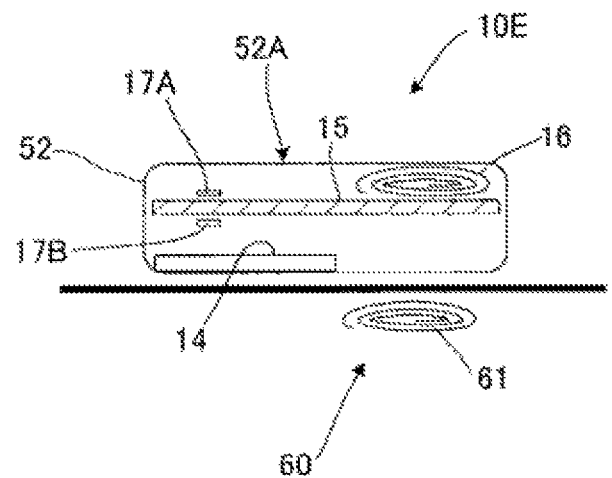
FIG.13
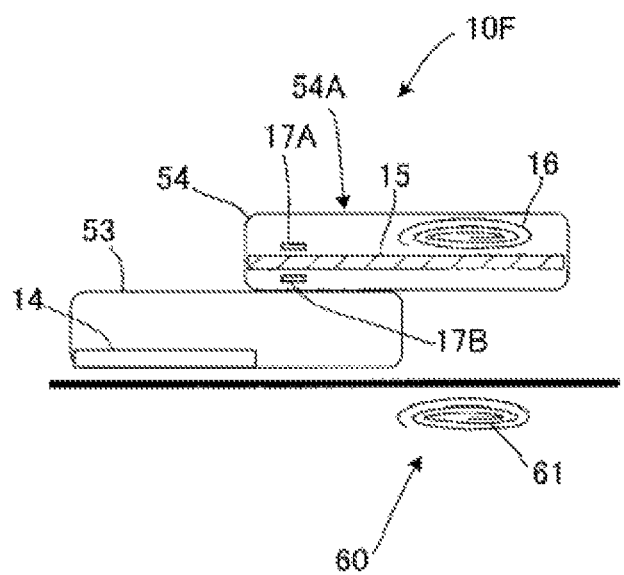

FIG.22
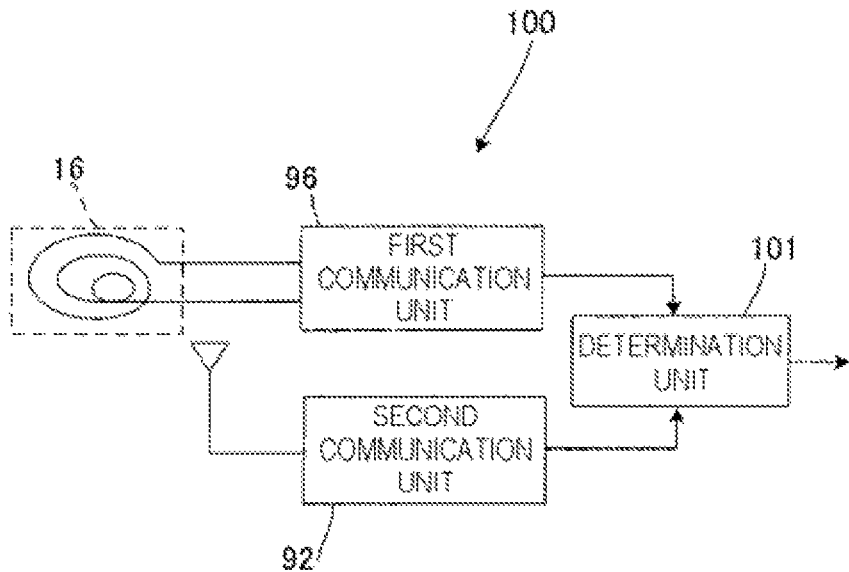
FIG.23
| | FRONT-SIDE DETERMINATION | BACK-SIDE DETERMINATION | WITHOUT PORTABLE PHONE |
|---|---|---|---|
| AUTHENTICATION OF FeliCa | OK | OK | NG |
| AUTHENTICATION OF CONTACTLESS CHARGE | OK | NG | NA |
FIG.24
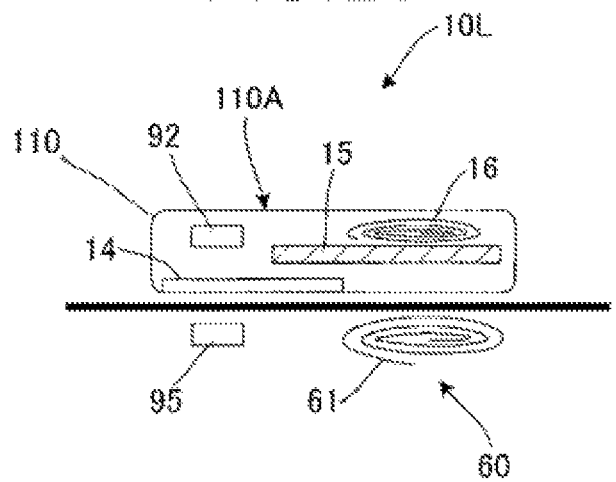

ELECTRONIC APPARATUS AND ELECTRONIC APPARATUS CHARGING SYSTEM

TECHNICAL FIELD

The present invention relates to an electronic apparatus using as a power source a secondary battery that can be charged by a charger which performs charging in a contacting manner, such as portable phones, PDA (Personal Digital Assistants), or portable terminals, and also relates to an electronic apparatus charging system.

BACKGROUND ART

In a hitherto electronic apparatus charging system, an induction coil provided in a charger and a passive coil provided in an electronic apparatus are placed closely to each other. The electronic charging system supplies electric power to the electronic apparatus by means of electromagnetic induction. For instance, a portable communication apparatus disclosed in Patent Literature 1 has a coil for receiving an electric power component in a contactless manner from the outside and a charging circuit that converts the electric power component received through the coil into a given value of charging electric power and charges a battery by use of the thus-converted charging electric power.

A hitherto portable terminal also has a contactless communication function. For instance, a portable terminal disclosed in Patent Literature 2 has display means capable of displaying an image used for reading data on a display screen; contactless data transmission means for transmitting data by way of an antenna in a contactless manner; posture detection means for detecting a posture of the portable terminal itself; and contactless data transmission prohibition means for prohibiting the contactless data transmission means from transmitting data when the posture detection means has detected a predetermined posture.

CITATION LIST

Patent Literature

Patent Literature 1: JP-A-2000-076399
Patent Literature 2: JP-A-2008-199331

SUMMARY OF THE INVENTION

Technical Problem

In a case of receiving electric power in a contactless manner, some of general users are unaware which face of a housing must be placed opposite a charger to charge an electronic apparatus. If the user considers that the minimum requirement is to place the apparatus opposite the charger regardless of which one of the faces of the apparatus is to be placed opposite the charger and if the user places the apparatus while a face of the apparatus inappropriate for receiving electric power is placed opposite the charger, there will arise significant inconvenience for a general user of the electronic apparatus; namely, the electronic apparatus remaining uncharged indefinitely.

The present invention has been conceived in light of the circumstances and aims at providing an electronic apparatus that enables its face appropriate for receiving electric power to be correctly oriented toward a charger that feeds electric power, as well as providing an electronic device charging apparatus.

Solution to Problem

An electronic apparatus includes: a housing having a predetermined face; a power receiver that receives electric power in a contactless manner by way of the predetermined face; a secondary battery that is charged by electric power received by the power receiver; a front-back detection unit that detects whether or not the predetermined face faces a charger; and an alarm unit that notifies that the predetermined face is situated at a position inappropriate for charging when the front-back detection unit detects that the predetermined face does not face the charger.

By means of the configuration, when it is detected that the predetermined face of the housing does not face the charger, an alarm to the effect that the housing is placed at a position inappropriate for charging is issued. By virtue of the alarm, the user becomes aware that the electronic apparatus is placed at an inappropriate position with respect to the charger. Hence, the user can correctly orient the face appropriate for receiving electric power toward the charger. As a result, a problem of the electronic apparatus remaining uncharged indefinitely does not occur.

In relation to the above-mentioned configuration, the housing has a first surface serving as the predetermined face and a second surface that is opposite to the first surface. An acceleration detection unit is provided as the front-back detection unit. The acceleration detection unit detects gravity of +1 when the first surface is situated down, whereas the acceleration defection unit detects gravity of −1 when the second surface is situated down, and the first surface is detected not to face the charger when the acceleration detection unit has detected a predetermined gravity from −1 to 0.

By means of the configuration, the acceleration detection unit can detect that the first surface of the housing does not face the charger with high accuracy.

In relation to the above-mentioned configuration, the housing is taken as a first housing, and the electronic apparatus further includes a second housing rotatably connected to the first housing. The first housing and the second housing overlap each other in a closed state, whereas, in an open state, the first housing and the second housing forms a predetermined angle α that is smaller than 180°, and where gravitational acceleration is taken as G, the predetermined gravity is calculated by $-1G \cdot \cos((180°-\alpha)/2)$.

By means of the configuration, even when the second surface is not oriented horizontally despite the fact that the second surface faces down in the closed state, it is possible to accurately detect that the first surface does not face the charger.

In relation to the above-mentioned configuration, in any one of the pieces of electronic apparatus as mentioned above, the power receiver is a power receiving coil far receiving electric power by utilization of electromagnetic induction.

By means of the configuration, a contactless chargeable electronic apparatus of electromagnetic induction type can be placed at a position appropriate for the charger.

In relation to the above-mentioned configuration, the housing has a first surface serving as the predetermined face and a second surface that is opposite to the first surface, and the power receiving coil is laid along the first surface. The electronic apparatus includes: a magnetic shield unit interposed between the power receiving coil and the second surface for shielding magnetism; and a magnetic sensor that is interposed between the magnetic shield unit and the second surface, the magnetic sensor serving as the front-back detection unit to sense intensity of magnetism. The front-back detection unit detects that the first surface does not face the charger when the magnetic sensor has sensed magnetism of predetermined intensity or more.

By means of the configuration, it is possible to detect that the first surface does not face the charger by means of intensity of the magnetism sensed by the magnetic sensor. Further, the power receiving coil is placed closely to the first surface to face the charger with reference to the magnetic shield unit. The magnetic detection unit is put on the second surface that should not face the charger. Hence, when the first surface faces the charger, the magnetic shield unit poses difficulty in transmitting electromagnetically-induced magnetism received by the power receiving coil to the magnetic sensor. As a result, it is possible to prevent the magnetic sensor from erroneously sensing that the first surface of the charger does not face the charger in spite of the first surface opposing the charger.

In relation to the configuration, the housing has a first surface serving as the predetermined face and a second surface that is opposite to the first surface, and the power receiving coil is laid along the first surface. The electronic apparatus includes: a magnetic shield unit that is interposed between the power receiving coil and the second surface for shielding magnetism; and a first magnetic sensor and a second magnetic sensor serving as the front-back detection section, the first magnetic sensor being interposed between the magnetic shield unit and the first surface for detecting intensity of magnetism, and the second magnetic sensor being interposed between the magnetic shield unit and the second surface for detecting intensity of magnetism. The front-back detection unit detects that the first surface does not face the charger when the intensity of magnetism sensed by fee second magnetic sensor is greater than intensity of the magnetism sensed by the first magnetic sensor.

By means of the configuration, the face opposing the charger is detected on the basis of a difference between the intensity of magnetism detected by the first magnetic sensor and the intensity of magnetism detected by the second magnetic sensor. Hence, even when absolute values of magnetism detected by the two magnetic sensors are small, it is possible to accurately detect an opposing face. Further since the magnetic shield unit is interposed between the first magnetic sensor and the second magnetic sensor, a difference between the intensities of magnetism sensed by the two magnetic sensors becomes greater, so that the opposing surface can be detected more accurately.

In relation to the above-described configuration, the electronic apparatus includes a first communication unit establishes communication with the charger by use of the power receiving coil and a second communication unit that establishes wireless communication with the charger, the first communication unit and the second communication unit serving as the front-back detection unit. The front-back detection unit detects that the predetermined face does not face the charger when the first communication unit cannot establish communication with the charger and when the second communication unit can establish communication with the charger.

By means of the configuration, the second communication unit is provided; hence, even when the first communication unit cannot carry out communication with the charger, it is possible to detect that the predetermined face of the housing of the electronic apparatus does not face the charger. A short-range wireless communication unit already incorporated as the second communication unit in the portable phone, or the like, such as FeliCa (Registered Trademark), is used, thereby obviating a necessity to newly provide a specific device.

A distance over which power can be transmitted by use of electromagnetic induction between a power transmission coil of the charger and the power receiving coil of the electronic apparatus is generally short. Further, a communication distance achieved even when communication is performed while superimposed on power to be sent by means of electromagnetic induction and by utilization of load modulation, or the like, is also short. In the meantime, when communication is performed by use of an electromagnetic wave, or the like, by way of a power receiving antenna, a communication distance achieved at this time is longer than the communication distance achieved when communication is performed while superimposed on electromagnetic induction. When it is detected that the predetermined face of the housing of the electronic apparatus does not face the charger by utilization of the second communication unit, an alarm to the effect that the predetermined face does not face the charger may be sent to the charger, thereby notifying the user that the charger is placed at a position inappropriate for charging by means of the alarm.

In relation to the above-mentioned configuration, the housing has a first surface serving as the predetermined face and a second surface that is opposite to the first surface. The power receiving coil is laid along the first surface. A magnetic shield unit is interposed between the power receiving coil and the second surface for shielding magnetism, and the second communication unit is exposed on the first surface and the second surface than the magnetic shield unit is.

By means of the configuration, since the second communication unit is exposed on both the first surface and the second surface than the magnetic shield unit is, the second communication unit can perform wireless communication at all times.

An electronic apparatus charging system includes the electric apparatus as defined above and the charger.

Advantageous Effects of the Invention

According to the present invention, if a predetermined face of a housing of an electronic apparatus is not placed opposite a charger, the user will be notified that the electronic apparatus is placed at a position inappropriate for charging. Therefore, the user becomes aware that the electronic apparatus is placed at an inappropriate position with respect to the charger and can correctly orient a face appropriate for receiving electric power toward the charger. As a result, there is no chance that inconvenience of the electronic apparatus being not charged indefinitely will arise.

BRIEF DESCRIPTION OF THE DRAWINGS

FIG. 3 is a block diagram showing a general configuration of the charging portion of the electronic apparatus shown in FIG. 1.

FIG. 4 is a block diagram showing a general configuration of a front-back detection unit shown in FIG. 3.

FIG. 5 is a table showing a relationship between an output of a magnetic sensor in the front-back detection unit shown in FIG. 3 and a front-back determination of a portable phone.

FIG. 11 is an illustration showing a relationship between outputs from two magnetic sensors of the front-back detection unit shown in FIG. 10 and a font-back determination of a portable phone.

FIG. 12 is an illustration showing a general configuration of a charging portion of a straight-type portable phone, which is an example application of the electronic apparatus shown in FIG. 8, and that of the charger for feeding charging electric power to the portable phone.

FIG. 13 is an illustration showing a general configuration of a charging portion of a slide-type portable phone, which is an example application of the electronic apparatus shown in FIG. 8, and that of the charger for feeding charging electric power to the portable phone.

FIG. 22 is a block diagram, showing a general configuration of a front-back detection unit of the electronic apparatus shown in FIG. 20.

FIG. 23 is an illustration showing a relationship between a result of approval of FeliCa and a result of approval of contactless charge performed by the front-back detection unit shown in FIG. 20 and front-back determination of a portable phone.

FIG. 24 is an illustration showing a general configuration of a charging portion of a straight-type portable phone, which is an example application of the electronic apparatus shown in FIG. 20, and that of the charger for feeding charging electric power to the portable phone.

DESCRIPTION OF EMBODIMENTS

Preferred embodiments for implementing the present invention are hereunder described in detail by reference to the drawings.

First Embodiment

Figure 1:
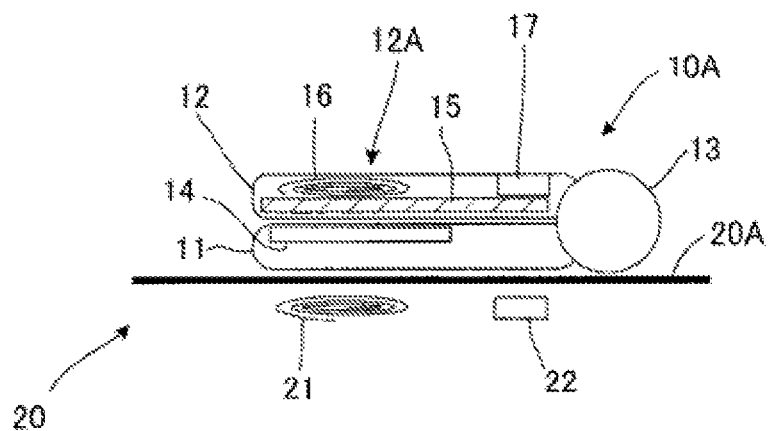
FIG. 1 is an illustration showing a general configuration of a charging portion of an electronic apparatus of a first embodiment of the present invention and that of a charger for feeding charging electric power to the electronic apparatus.
Figure 2:
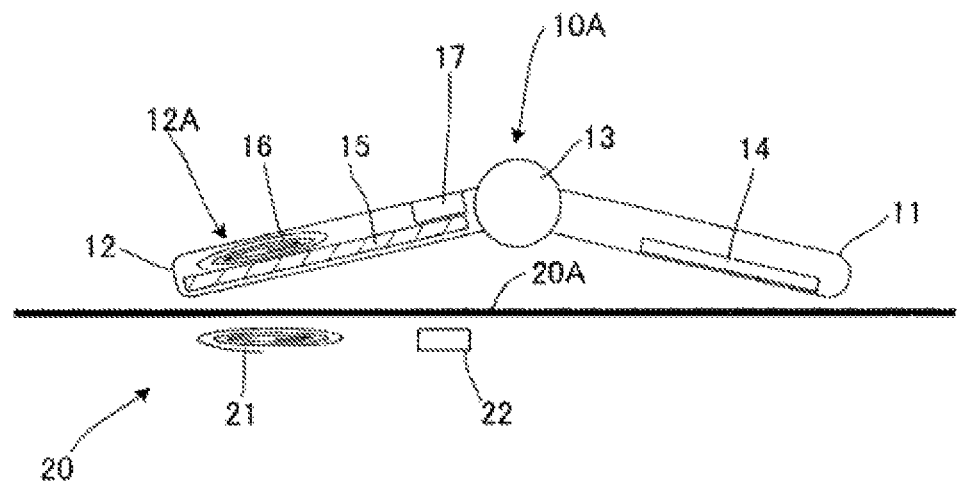
FIG. 2 is an illustration showing that two housings of the electronic apparatus shown in FIG. 1 are opened up.

FIG. 1 is an illustration showing a general configuration of a charging portion of an electronic apparatus of a first embodiment of the present invention and that of the charger for feeding charging electric power to the electronic apparatus. The electronic apparatus of the present embodiment is assumed to be a portable phone and hence hereinafter called a "portable phone."

in FIG. 1, a portable phone 10A of the present embodiment has a flip structure including an upper housing 11 and a lower housing 12 rotatably connected to the upper housing 11 by way of a hinge 13. The illustration shows that the portable phone 10A is put upside down (with its upper housing 11 down), while remaining closed, on a charger 20. FIG. 2 shows a state in which the upper housing 11 and the lower housing 12 are opened up from the state shown in FIG. 1.

A liquid crystal display unit 14 is incorporated in the upper housing 11, and a sheet-like shield member (a magnetic shield unit) 15, a power receiving coil 16, and a magnetic sensor 17 are incorporated in the lower housing 12. The power receiving coil 16 and the magnetic sensor 17 are put close to a back side (a predetermined side) 12A of the lower housing 12 than the shield member 15 is. The power receiving coil 16 receives electric power, in a contactless manner, from a power transmission coil 21 of the charger 20. In addition to including the power transmission coil 21, the charger 20 has a magnet 22. The power transmission coil 21 and the magnet 22 are placed in proximity to a surface of a charger-side face 20A of the charger 20. The magnetic sensor 17 incorporated in the lower housing 12 senses magnetism originating from the magnet 22 of the charger 20.

FIG. 3 is a block diagram showing a general configuration of the charging portion of the electronic apparatus of the present embodiment. In the illustration, the charging portion of the portable phone 10A is built from a power receiver 30, a secondary battery 31 a front-back detection unit 32, a control unit 33, and an alarm unit 34. The power receiver 30 includes the previously-described power receiving coil 16 and receives electric power in a contactless manner by way of the back side 12A of the lower housing 12 of the portable phone 10A, thereby charging the secondary battery 31 with the thus-received electric power. Now, when the portable phone 10A stays in either the state shown in FIG. 1 or FIG. 2, the power receiver 30 cannot receive electric power from the charger 20 because of the shield member 15. Specifically, when the portable phone 10A is put upside down on the charger 20 with respect to the charger 20, normal charging operation cannot be carried out. For this reason, it is necessary to detect whether or not the back side (the predetermined side) 12A of the lower housing 12 of the portable phone 10A faces the charger 20.

The front-back detection unit 32 detects whether or not the back side 12A of the lower housing 12 of the portable phone 10A faces the charger 20. FIG. 4 is a block diagram showing a general configuration of the front-back detection unit 32. As shown in the drawing, the front-back detection unit 32 includes the previously-described magnetic sensor 17 and a determination unit 35.

As mentioned previously, the magnetic sensor 17 senses magnetism originating from the magnet 22 of the charger 20. When the portable phone 10A is situated in the state shown in FIG. 1 or FIG. 2, the shield member 15 blocks the magnetism, so that the magnetic sensor cannot sense the magnetism originating from the magnet 22. On the contrary, when the portable phone 10A is in a state opposite to that shown in FIG. 1 or FIG. 2, the shield member 15 is not interposed between the magnet 22 and the magnetic sensor 17, so that the magnetic sensor can sense the magnetism originating from the magnet 22. When the magnetism is sensed, an output from the magnetic sensor 17 becomes high. On the contrary, when the magnetism is not sensed, the output becomes low.

In accordance with an output from the magnetic sensor 17, the determination unit 35 determines whether or not the back side 12A of the lower housing 12 of the portable phone 10A faces the charger 20, and a determination result is reported to the control unit 33. In this case, when the output from the magnetic sensor 17 is high, the hack side 12A is determined to face the charger. When the output is low, the hack side 12A is determined not to face the charger. When the back side 12A of the lower housing 12 of the portable phone 10A faces the charger 20, the portable phone 10A faces up. On the contrary, when the back side 12A of the lower housing 12 of the portable phone 10A does not face the charger 20, the portable phone 10A faces down. The states shown in FIGS. 1 and 2 correspond to a state of the portable phone 10A facing down. FIG. 5 is a table showing a relationship between the output front the magnetic sensor 17 and the front-back determination of the portable phone 10A.

In FIG. 3, when the front-back detection unit 32 has detected that the back side 12A of the lower housing 12 of the portable phone 10A does not face the charger 20, the control unit 33 controls the alarm unit 34, thereby notifying a user that the portable phone 10A is in a position inappropriate for charging. Conceivable alarming ways are (1) to (4) provided below.

(1) Emitting sound
(2) Emitting light
(3) Causing vibration
(4) Displaying an alarm on the liquid crystal display unit 14

The ways (1) to (4) can also be combined with each other.

In connection with the portable phone 10A having such a configuration, if the hack side 12A of the lower housing 12 of the portable phone 10A does not face the charger 20 when the portable phone 10A is put on the charger 20 in order to charge the secondary battery of the portable phone 10A, the magnetic sensor 17 of the front-back detection, unit 32 of the portable phone 10A cannot sense the magnetism originating from the magnet 22 of the charger 20. Therefore, the control unit 33 controls the alarm unit 34 so as to notify the user that the portable phone 10A is placed at a position inappropriate for charging. The alarm makes the user become aware that the portable phone 10A is placed at a position inappropriate for the charger 20. A face of the portable phone appropriate for receiving electric power; namely, the back side 12A of the lower housing 12, can be correctly oriented toward the charger 20. This prevents occurrence of a problem of the portable phone being not charged indefinitely.

Although the flip portable phone is taken as the electronic apparatus in the embodiment, the electronic apparatus may also be a straight portable phone built from one housing and a slide-type portable phone that is built from two housings and that is opened and closed as a result of one of the two housings making a slide with respect to the other housing.

Figure 6:
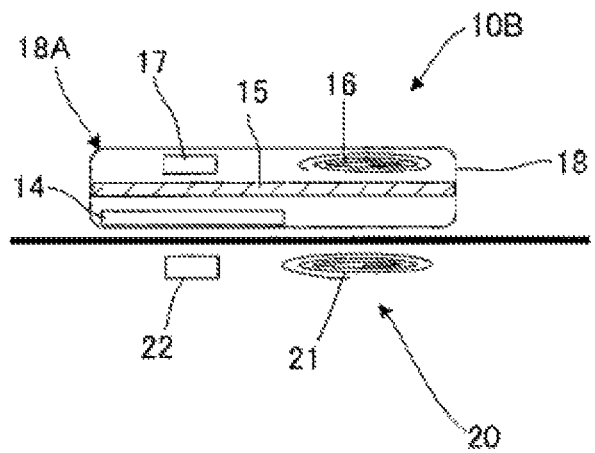
FIG. 6 is an illustration showing a general configuration of a charging portion of a straight-type portable phone, which is an example application of the electronic apparatus shown in FIG. 1, and that of the charger that feeds charging electric power to the portable phone.

FIG. 6 is an illustration showing a general configuration of a charging portion of a straight-type portable phone 10B and that of the charger 20 that feeds charging electric power to the portable phone 10B. In the illustration, the liquid crystal display unit 14, the shield member 15, the power receiving coil 16, and the magnetic sensor 17 are provided in one housing 18. The power receiving coil 16 and the magnetic sensor 17 are placed in proximity to a back side 18A of the housing 18 than the shield member 15 is.

Figure 7:
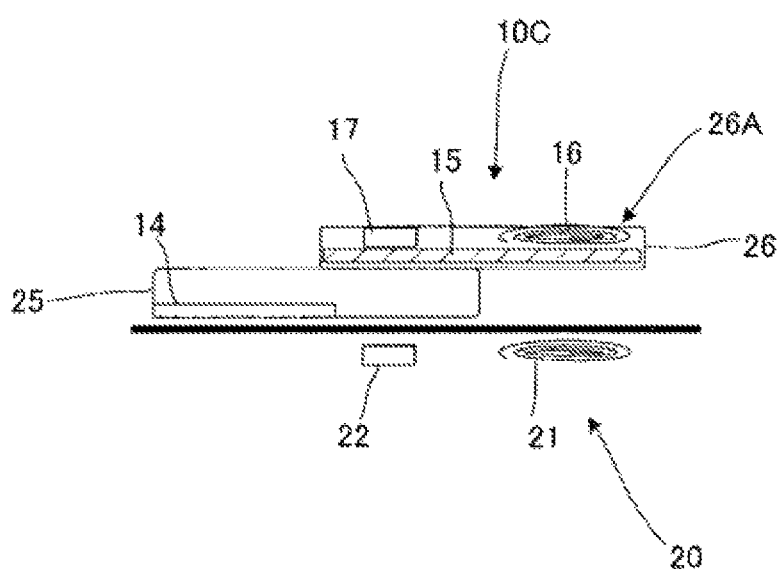
FIG. 7 is an illustration showing a general configuration of a charging portion of a slide-type portable phone, which is an example application of the electronic apparatus shown in FIG. 1, and that of the charger that feeds charging electric power to the portable phone.

FIG. 7 is an Illustration showing a general configuration of a charging portion of a slide-type portable phone 10C and that of the charger 20 that feeds charging electric power to the portable phone 10C. In the illustration, the liquid crystal display unit 14 is incorporated in an upper housing 25, whilst the shield member 15, the power receiving coil 16, and the magnetic sensor 17 are incorporated in a lower housing 26. The power receiving coil 16 and the magnetic sensor 17 are placed in proximity to a back side 26A of the lower housing 26 than the shield member 15 is.

In the present embodiment, any one of the portable phones 10A to 10C and the charger 20 make up an electronic apparatus charging system.

Second Embodiment

Figure 8:
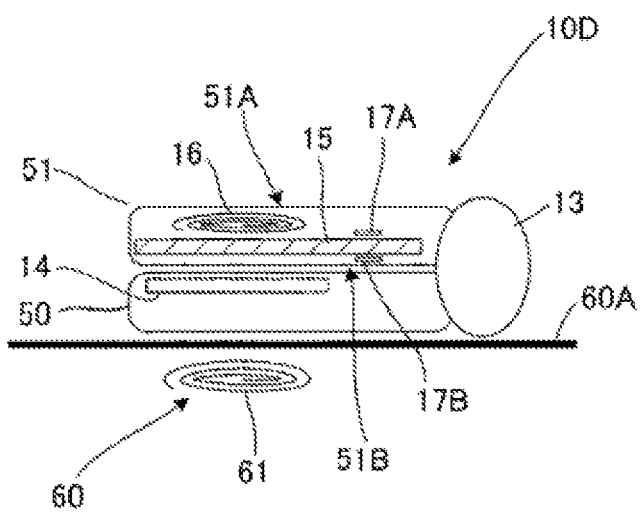
FIG. 8 is an illustration showing a general configuration of a charging portion of an electronic apparatus of a second embodiment of the present invention and that of a charger that feeds charging electric power to the electronic apparatus.

FIG. 8 is an illustration showing a general configuration of a charging portion of an electronic apparatus of a second embodiment of the present invention and that of a charger that feeds charging electric power to the electronic apparatus. Even in the second embodiment of the present invention, a portable phone is taken as the electronic apparatus in the same manner as in the first embodiment. Therefore, the electronic apparatus is hereunder referred to as a "portable phone."

Figure 9:
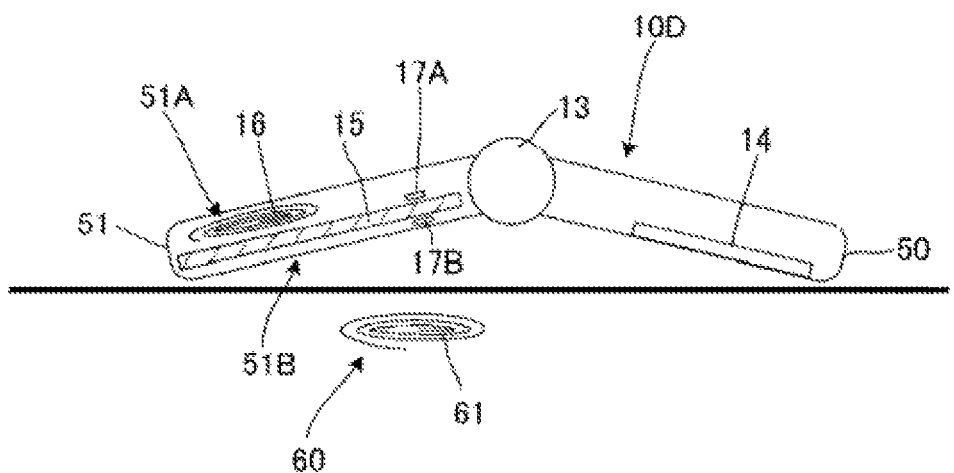
FIG. 9 is an illustration showing that two housing of the electronic apparatus shown in FIG. 8 are opened up.

In FIG. 8, a portable phone 10D of the present embodiment has a flip structure built from an upper housing 50 and a lower housing 51 rotatably connected to the upper housing 50 by way of the hinge 13. The portable phone 10D of the embodiment can open and close in a lateral direction by means of an unillustrated another hinge, as well as being able to open and close in a longitudinal direction by means of the hinge 13. FIG. 8 shows that the portable phone is closed in both the longitudinal and lateral directions and placed upside down with respect to a charger 60 (the upper housing 50 is held face down). FIG. 9 shows a state that the portable phone 10D is opened from the state shown in FIG. 8 in the longitudinal direction.

In FIG. 8, the liquid crystal display unit 14 is incorporated in the upper housing 50, and the shield member 15, the power receiving coil 16, and magnetic sensors 17A and 17B are incorporated in the lower housing 51. The power receiving coil 16 and the magnetic sensor 17A are placed in proximity to a back side 51A of the lower housing 51 than the shield member 15 is. A magnetic sensor 17B is placed opposite the magnetic sensor 17A with the shield member 15 sandwiched therebetween. The power receiving coil 16 receives electric power from a power transmission coil 61 of the charger 60 in a contactless manner. In addition to including the transmission coil 21, the charger 20 described in connection with the first embodiment has the magnet 22. However, in the present embodiment, the charger 60 only has the power transmission coil 61. The power transmission coil 61 is placed in proximity to the surface of a charging-side face 60A of the charger 60.

Figure 10:
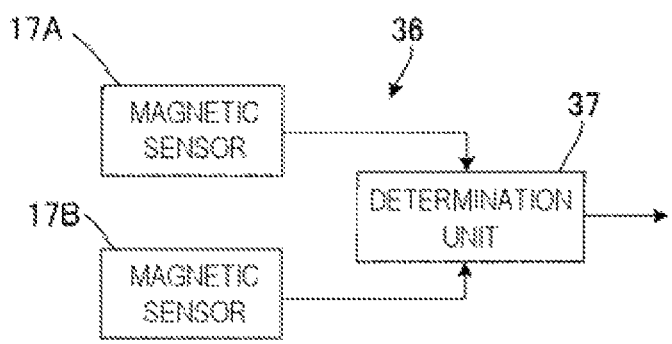
FIG. 10 is a block diagram showing a general configuration of a front-back detection unit of the electronic apparatus shown in FIG. 8.

A charging portion of the portable phone 10D of the embodiment is substantially identical with the charging portion of the portable phone 10A of the first embodiment in terms of a structure. However, a difference lies between them in view of the front-back detection unit. FIG. 10 is a block diagram showing a general configuration of a front-back detection unit 36 of the charging portion belonging to the portable phone 10D of the present embodiment. In the illustration, the front-back detection unit 36 is built from the previously-described magnetic sensors 17A and 17B and a determination unit 37. The determination unit 37 determines whether or not the back side 51A of the lower housing 51 of the portable phone 10D faces the charger 60 according to outputs from the respective magnetic sensors 17A and 17B, and notifies the control unit 33 of a determination result.

When the output from the magnetic sensor 17A represents a high level and when the output from the magnetic sensor 17B represents a low level, the determination unit 37 determines that the back side 51A of the lower housing 51 of the portable phone 10D faces the charger 60. When the output from the magnetic sensor 17A represents a low level and when the output from the magnetic sensor 17B represents a high level, the determination unit determines that the back side 51A of the lower housing 51 of the portable phone 10D does not face the charger 60. When both the output from the magnetic sensor 17A and the output from the magnetic sensor 17B represent low levels, the determination unit determines that the charger 60 is not present (a mount for the portable phone 10D is not present). States shown in FIGS. 8 and 9 correspond to a state where the back side 51A of the lower housing 51 of the portable phone 10D does not face the charger 60.

FIG. 11 is an illustration, showing a relationship between outputs from the magnetic sensors 17A and 17B and a front-back determination. When the back side 51A of the lower housing 51 of the portable phone 10D faces the charger 60, the portable phone 10D is oriented to the front. When the back side 51A of the lower housing 51 of the portable phone 10D does not face the charger 60, the portable phone 10D is determined to face down. Therefore, when the output from the magnetic sensor 17A shows a high level and when the output fern the magnetic sensor 17B shows a low level, the portable phone 10D is determined to face upside. When the output from the magnetic sensor 17A shows a low level and when the output from the magnetic sensor 17B shows a high level, the portable phone 10D is determined face down. When both the output from the magnetic sensor 17A and the output from the magnetic sensor 17B show low levels, the mount is determined not to be present; namely, the charger 60 is determined not to be present.

In the portable phone 10D having such a configuration, if the back side 51A of the lower housing 51 of the portable phone 10D does not face the charger 60 when the portable phone 10D is put on the charger 60 in order to charge a secondary battery of the portable phone 10D, the magnetic sensor 17A of the front-back detection unit 36 of the portable phone 10D cannot sense magnetism originating from the charger 60. In the meantime, the magnetic sensor 17B senses the magnetism originating from the charger 60. Hence, the determination unit 37 determines that the back side 51A of the lower housing 51 of the portable phone 10D does not face the charger 60. The control unit 33 causes the alarm unit 34 to notify the user that the portable phone 10D is placed at a position inappropriate for charging. By virtue of the notification, the user becomes aware that the portable phone 10D is placed at a position inappropriate for the charger 60, so that the user can correctly orient a face of the lower housing appropriate for receiving electric power; namely the hack side 51A of the lower housing 51, toward the charger 60. As a result, it does not cause a problem of the portable phone indefinitely remaining uncharged.

In addition to being able to open and close in the longitudinal direction by means of the hinge 13, the portable phone 10D of the embodiment can open and close in the lateral direction by means of another unillustrated hinge. Therefore, the magnetic sensor 17A can also double as a sensor for detecting longitudinal opening and closing actions, and the magnetic sensor 17B can also double as a sensor for detecting lateral opening and closing actions.

In the embodiment, the electronic apparatus is embodied by the flip portable phone. However, the electronic apparatus can also be a straight-type portable phone built from one housing or a slide-type portable phone that is built from two housings and that opens and closes when another housing is slid with respect to one housing.

FIG. 12 is a block diagram showing a general configuration of a charging portion of a straight-type portable phone 10E and a general configuration of the charger 60 for feeding charging electric power to the portable phone 10E. In the illustration, the liquid crystal display unit 14, the shield member 15, the power receiving coil 16, and the magnetic sensors 17A and 17B are incorporated in one housing 52. The power receiving coil 16 and the magnetic sensor 17A are placed in proximity to the back side 52A of a housing 52 than the shield member 15 is.

FIG. 13 is a block diagram showing a general configuration of a charging portion of a slide-type portable phone 10F and that of the charger 60 for feeding charging electric power to the portable phone 10F. In the illustration, the liquid crystal display unit 14 is incorporated in an upper housing 53, the shield member (a magnetic shield block) 15, the power receiving coil 16, and the magnetic sensors 17A and 17B are incorporated in a lower housing 54. The power receiving coil 16 and the magnetic sensor 17A are placed in proximity to a back side 54A of the lower housing 54 than the shield member 15 is.

In the present embodiment, any one of the portable phones 10D to 10F and the charger 60 make up an electronic apparatus charging system.

Third Embodiment

Figure 14:
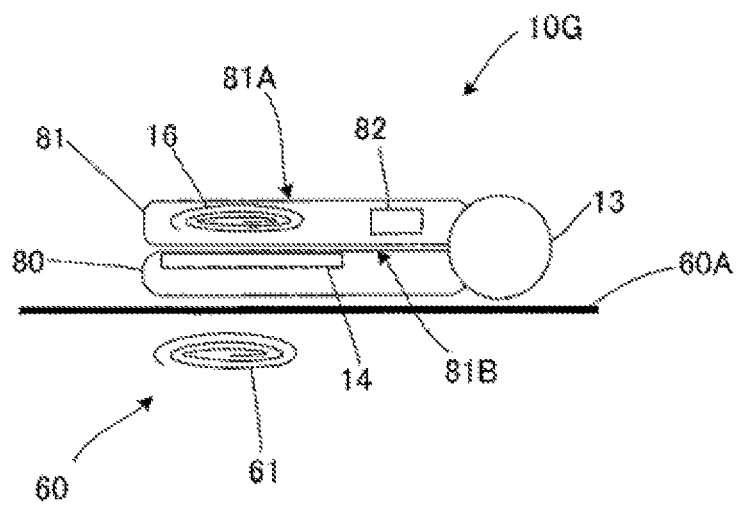
FIG. 14 is an illustration showing a general configuration of a charging portion of an electronic apparatus of a third embodiment of the present invention and that of a charger for feeding charging electric power to the electronic apparatus.

FIG. 14 is an illustration showing a general configuration of a charging portion of an electronic apparatus of a third embodiment of the present invention and that of a charger for feeding charging electric power to the electronic apparatus. In the third embodiment of the present invention, the electronic apparatus is assumed to be a portable phone in the same manner as in the first embodiment. The electronic apparatus is hereinafter called a "portable phone."

Figure 15:
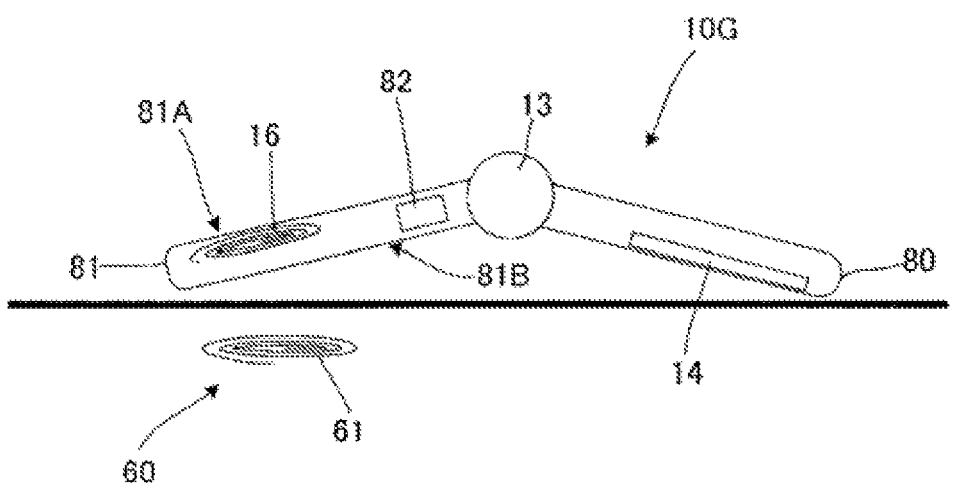
FIG. 15 is an illustration showing the electronic apparatus shown in FIG. 14 whose two housings are opened up.

In FIG. 14 a portable phone 10G of the embodiment has a flip structure including an upper housing (a second housing) 80 and a lower housing (a first housing) 81 that is rotatably connected to the upper housing 80 by way of the hinge 13. The liquid crystal display unit 14 is incorporated in the upper housing 80, and the power receiving coil 16 and an acceleration sensor 82 are incorporated in the lower housing 81. The power receiving coil 16 receives electric power, in a contactless manner, from the power transmission coil 61 of the charger 60. Although the charger 20 of the first embodiment has the magnet 22 in addition to the power transmission coil 21, in the present embodiment the charger 60 has only the power transmission coil 61. The power transmission coil 61 is placed in proximity to the surface of the charging-side face 60A of the charger 60. FIG. 15 shows that the portable phone is opened in the longitudinal direction from the state shown in FIG. 14.

Figure 16:
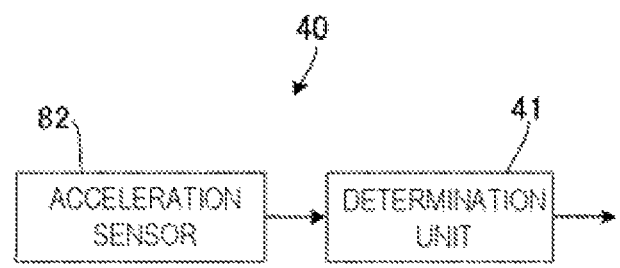
FIG. 16 is a block diagram showing a general configuration of a front-back detection unit of the electronic apparatus shown in FIG. 14.

The charging portion of the portable phone 10G of the present embodiment is substantially identical with the charging portion of the portable phone 10A of the first embodiment. The charging portions differ from each other in terms of the front-back detection unit. FIG. 16 is a block diagram showing a general configuration of a front-back detection unit 40 of the charging portion belonging to the portable phone 10G of the present embodiment. In the illustration, the front-back detection unit 40 is built from the acceleration sensor 82 and a determination unit 41 that determines, from an output from the acceleration sensor 82, whether or not a back side 81A (a first surface) of the lower housing 81 of the portable phone 10G faces the charger 60 and that outputs a determination result to the control unit 33. When an output from the acceleration sensor 82 ranges from −1G to −0.8G, the determination unit 41 determines that the back side 81A of the lower housing 81 of the portable phone 10G does not face the charger 60 (put in the other word, another front side 81B of the back side 81A is determined to face the charger). When the output shows "+1G," the back side 81A of the lower housing 81 of the portable phone 10G is determined to face the charger 60. Reference symbol G denotes gravitational acceleration. The state shown in FIGS. 14 and 15 is a state in which, the back side 81A of the lower housing 81 of the portable phone 10G does not face the charger 60.

An output front the acceleration sensor 82 produced when the upper housing 80 and the lower housing 81 are opened, at an angle α as shown in FIG. 15 comes to; for instance, −0.8G. The value can be generally calculated by means of Mathematical Expression (1) provided below when the upper housing 80 and the lower housing 81 are of the same length and when an open angle between the housings is α.

$$-1G \cdot \cos((180°-\alpha)/2) \quad (1)$$

Figure 17:
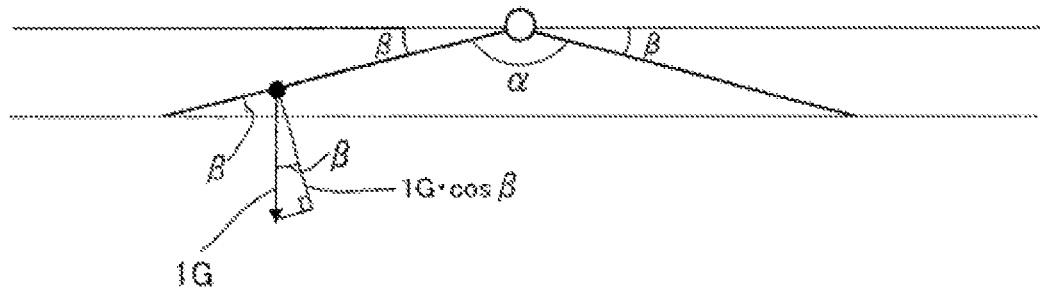
FIG. 17 is an illustration for describing a principle of the front-back detection section to detect the electronic apparatus shown in FIG. 14.

Mathematical Expression (1) is derived from FIG. 17. Specifically, the vertical output from the acceleration sensor 82 is −1G. When the housings are opened at an angle α, the output comes to −1G·cos β. Since β is (180°−α)/2, so that the Mathematical Expression (1) can thereby be obtained. For instance, given that α is 120°, a value of about 0.87 is calculated.

In relation to the portable phone 10G having such a configuration, when the portable phone 10G is put on the charger 60 in order to charge a secondary battery of the portable phone 10G, if the back side 81A of the lower housing 81 of the portable phone 10G does not face the charger 60, the output from the acceleration sensor 82 of the front-back detection unit 40 of the portable phone 10G comes to −1G or more to −0.8G (or predetermined gravity that ranges from −1G to 0G). The determination unit 41 determines that the back side 81A of the lower housing 81 of the portable phone 10G does not face the charger 60. The control unit 33 causes the alarm unit 34 to notify the user that the portable phone 10G is placed at a position inappropriate for charging. By virtue of the notification, the user becomes aware that the portable phone 10G is placed at a position inappropriate with respect to the charger 60. Thus, a face of the lower housing appropriate for receiving electric power; namely, the hack side 81A of the lower housing 81, can be correctly oriented toward the charger 60. Thus, occurrence of a problem of the portable phone indefinitely remaining uncharged can be prevented.

In the embodiment, the electronic apparatus is embodied by the flip portable phone. However, the electronic apparatus can also be a straight-type portable phone built from one housing or a slide-type portable phone that is built from two housings and that opens and closes when another housing is slid with respect to one housing.

Figure 18:
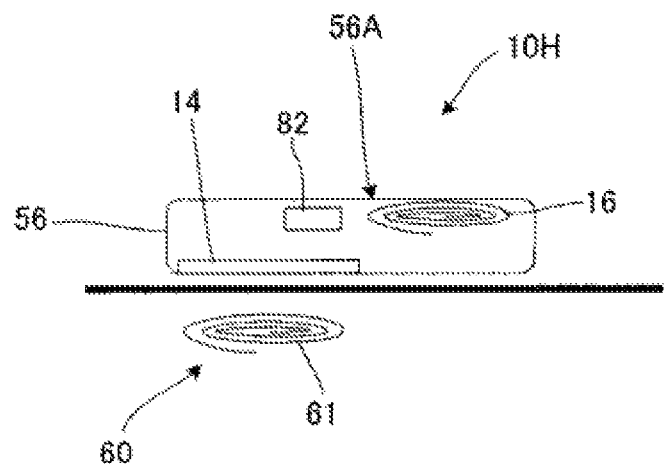
FIG. 18 is an illustration showing a general configuration of a charging portion of a straight-type portable phone, which is an example application of the electronic apparatus shown in FIG. 14, and that of the charger for feeding charging electric power to the portable phone.

FIG. 18 is a block diagram showing a general configuration of a charging portion of a straight-type portable phone 10H and a general configuration of the charger 60 for feeding charging electric power to the portable phone 10H. In the illustration, the liquid crystal display unit 14, the power receiving coil 16, and the acceleration sensor 82 are incorporated in one housing 56. The power receiving coil 16 and the acceleration sensor 82 are placed in proximity to a hack side 56A of the housing 56.

Figure 19:
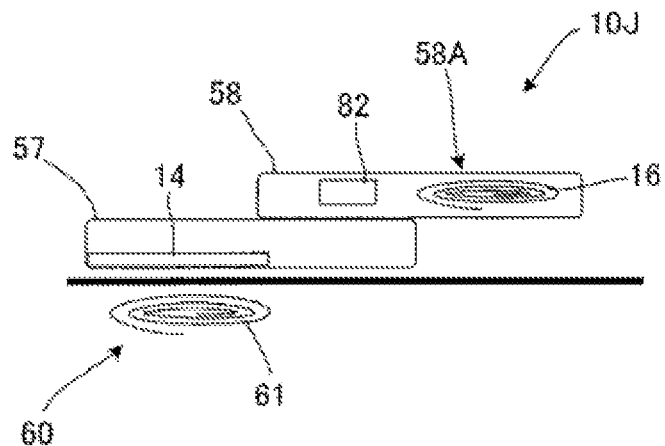
FIG. 19 is an illustration showing a general configuration of a charging portion of a slide-type portable phone, which is an example application of the electronic apparatus shown in FIG. 14, and that of the charger for feeding charging electric power to the portable phone.

FIG. 19 is a block diagram showing a generation configuration of a charging portion of a slide-type portable phone 10J and that of the charger 60 for feeding charging electric power to the portable phone 10J. In the illustration, the liquid crystal display unit 14 is incorporated in an upper housing 57, and the power receiving coil 16 and the acceleration sensor 82 are incorporated in a lower housing 58. The power receiving coil 16 and the acceleration sensor 82 are placed, in proximity to a back, side 58A of the lower housing 58.

In the present embodiment, any one of the portable phones 10G, 10H, and 10J and the charger 60 make up an electronic apparatus charging system.

Fourth Embodiment

Figure 20:
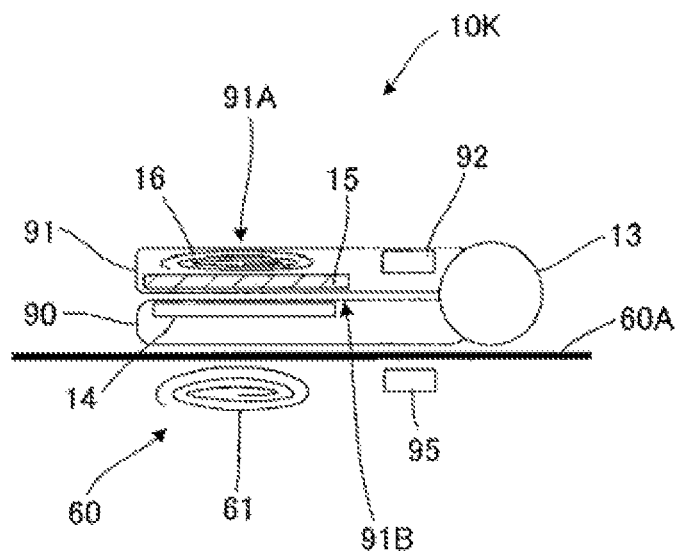
FIG. 20 is an illustration showing a general configuration of a charging portion of an electronic apparatus of a fourth embodiment of the present invention and that of a charger for feeding charging electric power to the electronic apparatus.

FIG. 20 is an illustration showing a general configuration of a charging portion of an electronic apparatus of a fourth embodiment of the present invention and that of a charger for feeding charging electric power to the electronic apparatus. The electronic apparatus of the fourth embodiment is assumed to be a portable phone in the same way as in the first embodiment and hence hereinafter called a "portable phone."

In FIG. 20, a portable phone 10K of the present embodiment has a flip structure including an upper housing 90 and a lower housing 91 rotatably connected to the upper housing 90 by way of the hinge 13. The liquid crystal display unit 14 is incorporated in the upper housing 90, and the shield member 15, the power receiving coil 16, and a second communication unit 92 are incorporated in the lower housing 91. The second communication unit 92 performs wireless communication with a reader 95 provided in the charger 60. The second communication unit 92 is preferably; for instance, FeliCa (Registered Trademark).

Figure 21:
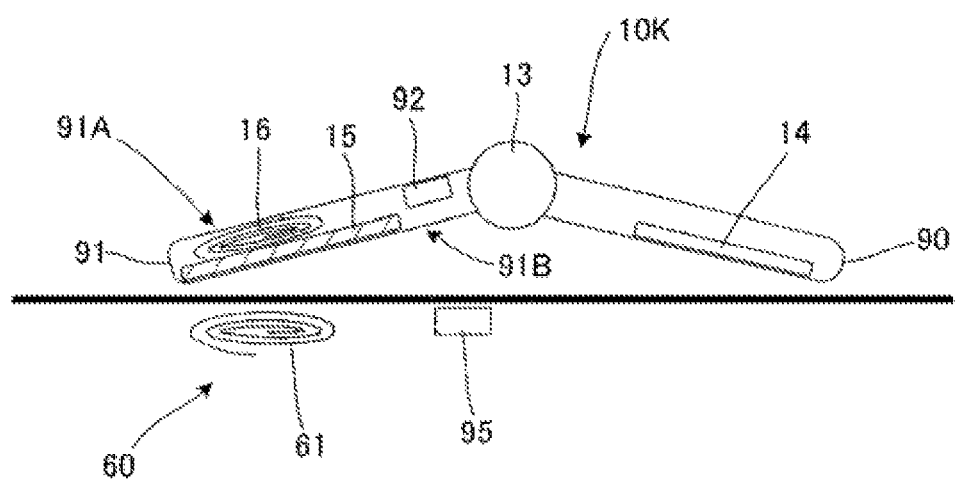
FIG. 21 is an illustration showing the electronic apparatus shown in FIG. 20 whose two housings are opened up.

The shield member 15 is interposed between the power receiving coil 16 laid along a back side 91A of the lower housing 91 and a front side 91B of the lower housing 91. The power receiving coil 16 and the second communication unit 92 are placed in proximity to the back side 91A of the lower housing 91 than the shield member 15 is. In this case, the shield member 15 is made short so as not to cover the second communication unit 92 so that wireless communication between the second communication unit 91 and the reader 95 is feasible on either the front side or the back side of the portable phone 10K. Specifically, the second communication unit 92 is exposed on the back side 91A of the lower housing 91 than the shield member 15 is and exposed on the front side 91B of the lower housing 91. As a matter of course, the second communication section 92 is not exposed outside, nor is it covered with the shield member 15. The power receiving coil 16 receives electric power, in a contactless manner, from the power transmission coil 61 of the charger 60. In addition to including the transmission coil 21, the charger 20 described in connection with the first embodiment has the magnet 22. However, in the embodiment, the charger 60 has only the power transmission coil 61. The power transmission coil 61 is put in proximity to the surface of the charging-side face 60A of the charger 60. FIG. 21 shows that the portable phone 10K in the state shown in FIG. 20 is opened up in the longitudinal direction.

The charging portion, of the portable phone 10K of the present embodiment is substantially identical with the charging portion of the portable phone 10A of the first embodiment. The charging portions differ from each other in terms of the front-back detection unit. FIG. 22 is a block diagram showing a general configuration of a front-back detection unit 100 of the charging portion belonging to the portable phone 10K of the present embodiment. In the illustration, the front-back detection unit 100 is built from the second communication unit 92, a first communication unit 96 that establishes communication with the charger 60 by use of the power receiving coil 16, and a determination unit 101 that determines, from the output from the second communication unit 92 and the output from the first communication unit 96, whether or not the back side 91A of the lower housing 91 of the portable phone 10K races the charger 60 and notifies the control unit 33 of a determination result. A dotted arrow put between the power receiver 30 and the front-back detection unit 32 shown in FIG. 3 denotes that the power receiving coil 16 is connected also to the first communication unit 96.

In a case of using FeliCa (Registered Trademark) as the second communication unit 92, when the second communication unit 92 has authenticated FeliCa; namely, OK ("OK" means that authentication of FeliCa is granted, and the same also applies to any counterparts in the following descriptions) is selected, and when contactless charge authentication performed by the first communication unit 96 is OK, the determination unit 101 determines that the back side 91A of the lower housing 91 of the portable phone 10K does not face the charger 60. When authentication of FeliCa performed by the second communication unit 92 is "OK" and when contactless charge authentication performed by the first communication unit 96 is not granted; namely, "NG" ("NG" means a failure to grant authentication, and the same also applies to any counterparts in the following descriptions) is selected, the determination unit 101 determines that the back side 91A of the lower housing 91 of the portable phone 10K faces the charger 60. When authentication of FeliCa performed by the second communication unit 92 is "NG" and when a determination is not made as to whether or not the first communication unit 96 has successfully authenticated contactless charge; namely, "NA (Not Applicable)" is selected, the determination unit 101 determines that the "portable phone is not present." The state shown in FIG. 20 and the state shown in FIG. 21 correspond to a state in which the back side 91A of the lower housing 91 of the portable phone 10K does not face the charger 60.

FIG. 23 is an illustration showing a relationship between the outputs from the first communication unit 96 and the second communication unit 92 and a front-back determination. When the back side 91A of the lower housing 91 of the portable phone 10K faces the charger 60, the portable phone 10K faces up. When the back side 91A of the lower housing 91 of the portable phone 10K does not face the charger 60, the portable phone 10K faces down. Therefore, when the authentication of FeliCa is "OK" and when the authentication of contactless charge is "OK," the portable phone 10K faces up. When the authentication of FeliCa is "OK" and when the authentication of contactless charge is "NG," the portable phone 10K faces down. When the authentication of FeliCa is "NG" and when authentication of contactless charge is "NA," the portable phone 10K is not present.

In relation to the portable phone 10K having such a configuration, if the back side 91A of the lower housing 91 of the portable phone 10K does not face the charger 60 when the portable phone 10K is put on the charger 60 in order to charge the secondary battery of the portable phone 10K, authentication of FeliCa performed by the second communication unit 92 of the front-back detection unit 100 of the portable phone 10K becomes OK and authentication of contactless charge performed by the first communication unit 98 becomes NG. The determination unit 101 determines that the back side 91A of the lower housing 91 of the portable phone 10K does not face the charger 60. The control unit 33 causes the alarm unit 34 to notify the user that the portable phone 10K is placed at a position inappropriate for charging. By virtue of the notification, the user becomes aware that the portable phone 10K is placed at a position inappropriate for the charger 60, so that the user can correctly orient a face of the lower housing appropriate for receiving electric power; namely, the back side 91A of the lower housing 91, toward the charger 60. As a result, it does not cause a problem of the portable phone indefinitely remaining uncharged.

In the embodiment, the electronic apparatus is embodied by the flip portable phone. However, the electronic apparatus can also be a straight-type portable phone built from one housing or a slide-type portable phone that is built from two housings and that opens and closes when another housing is slid with respect to one housing.

FIG. 24 is a block diagram showing a general configuration of a charging portion of a straight-type portable phone 10L and that of the charger 60 for feeding charging electric power to the portable phone 10L. In the illustration, the liquid crystal display unit 14, the shield member 15, the power receiving coil 16, and the second communication unit 92 are incorporated in one housing 110. The power receiving coil 16 and the second communication unit 92 are placed in proximity to a back side 110A of the housing 110.

Figure 25:
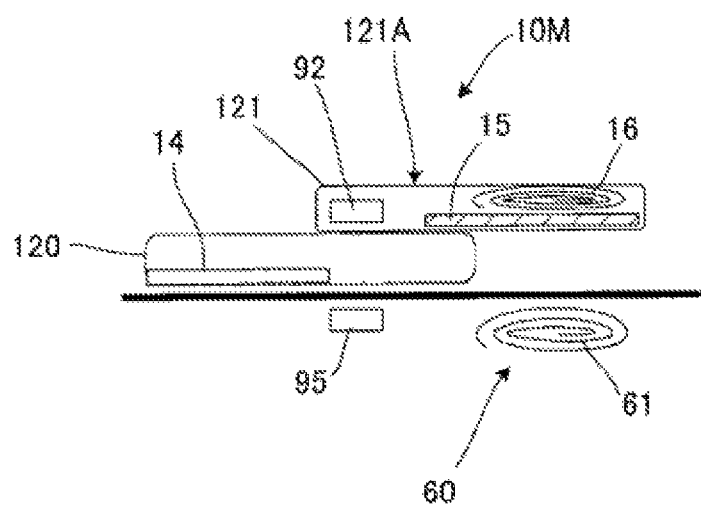
FIG. 25 is an illustration showing a generation configuration of a charging portion of a slide-type portable phone, which is an example application of the electronic apparatus shown in FIG. 20, and that of the charger for feeding charging electric power to the portable phone.

FIG. 25 is a block diagram showing a general configuration of a charging portion of a slide-type portable phone 10M and that of the charger 60 for feeding charging electric power to the portable phone 10M. In the illustration, the liquid crystal display unit 14 is incorporated in an upper housing 120, and the shield member 15, the power receiving coil 16, and the second communication unit 92 are incorporated in a lower housing 121. The power receiving coil 16 and the second communication unit 92 are placed in proximity to a back side 121A of the lower housing 121.

In the embodiment, any one of the portable phones 10K to 10M and the charger 60 make up the electronic apparatus charging system.

Although the first through fourth embodiments are used alone, two or more of the embodiments can also be used in combination.

Although the present invention has been described in detail by reference to the specific embodiments, it is manifest to those skilled in the art that the present invention is susceptible to various alterations and modifications without departing the spirit and scope of the present invention.

The present patent application is based on Japanese Patent Application (No. 2009-052055) filed on Mar. 5, 2009, the entire subject matter of which is incorporated herein by reference.

INDUSTRIAL APPLICABILITY

The present invention yields an advantage of the ability to correctly orient a face appropriate for receiving power toward a charger that feeds electric power, and can be applied to an electronic apparatus equipped with a secondary battery, like a portable phone and a PDA.

REFERENCE SIGNS LIST 10A to 10M: PORTABLE PHONE
11, 24, 50, 53, 80, 57, 90, 120: UPPER HOUSING
12, 26, 51, 54, 81, 58, 91, 121: LOWER HOUSING
12A, 26A, 51A, 54A, 81A, 58A, 91A, 121A: BACK SIDE OF LOWER HOUSING
13: HINGE
14: LIQUID CRYSTAL DISPLAY UNIT
15: SHIELD MEMBER
16: POWER RECEIVING COIL
17, 17A, 17B: MAGNETIC SENSOR
18, 52, 56, 110: HOUSING
18A, 52A, 56A, 110A: BACK SIDE OF INTEGRATED HOUSING
20, 60: CHARGER
20A, 60A: CHARGING-SIDE FACE OF CHARGER
21, 61: POWER TRANSMISSION COIL
22: MAGNET
30: POWER RECEIVER
31: SECONDARY BATTERY
32, 36, 40, 100: FRONT-BACK DETECTION UNIT
33: CONTROL UNIT
34: ALARM UNIT
35, 37, 41, 101: DETERMINATION UNIT
82: ACCELERATION SENSOR
51B, 81B, 91B: SURFACE OF LOWER HOUSING
92: SECOND COMMUNICATION UNIT
95: READER
96: FIRST COMMUNICATION UNIT

The invention claimed is:
1. An electronic apparatus comprising:
a housing having a predetermined face;
a power receiver that receives electric power in a contactless manner by way of the predetermined face;
a secondary battery that is charged by electric power received by the power receiver;
a front-back detection unit that detects whether or not the predetermined face faces a charger; and
an alarm unit that notifies that the predetermined face is situated at a position inappropriate for charging when the front-back detection unit detects that the predetermined face does not face the charger, wherein
the housing has a first surface serving as the predetermined face and a second surface that is opposite to the first surface,
an acceleration detection unit is provided as the front-back detection unit,
the acceleration detection unit detects gravity of +1 when the first surface is situated down, whereas the acceleration detection unit detects gravity of −1 when the second surface is situated down, and
the first surface is detected not to face the charger when the acceleration detection unit has detected a predetermined gravity from −1 to 0.
2. The electronic apparatus according to claim 1, wherein
the housing is taken as a first housing,
the electronic apparatus further includes a second housing rotatably connected to the first housing,
the first housing and the second housing overlap each other in a closed state, whereas, in an open state, the first housing and the second housing forms a predetermined angle α that is smaller than 180°, and
where gravitational acceleration is taken as G, the predetermined gravity is calculated by $-1G \cdot \cos((180°-\alpha)/2)$.
3. An electronic apparatus charging system, comprising:
the electric apparatus as defined in claim 1, and
the charger.
4. An electronic apparatus comprising:
a housing having a predetermined face;
a power receiver that receives electric power in a contactless manner by way of the predetermined face;
a secondary battery that is charged by electric power received by the power receiver;
a front-back detection unit that detects whether or not the predetermined face faces a charger; and
an alarm unit that notifies that the predetermined face is situated at a position inappropriate for charging when the front-back detection unit detects that the predetermined face does not face the charger, wherein
the power receiver is a power receiving coil for receiving electric power by utilization of electromagnetic induction,
the housing has a first surface serving as the predetermined face and a second surface that is opposite to the first surface,
the power receiving coil is laid along the first surface,
the electronic apparatus includes:
a magnetic shield unit interposed between the power receiving coil and the second surface for shielding magnetism; and
a magnetic sensor that is interposed between the magnetic shield unit and the second surface, the magnetic sensor serving as the front-back detection unit to sense intensity of magnetism, and
the front-back detection unit detects that the first surface does not face the charger when the magnetic sensor has sensed magnetism of predetermined intensity or more.
5. An electronic apparatus charging system, comprising:
the electric apparatus as defined in claim 4, and
the charger.
6. An electronic apparatus comprising:
a housing having a predetermined face;
a power receiver that receives electric power in a contactless manner by way of the predetermined face;
a secondary battery that is charged by electric power received by the power receiver;
a front-back detection unit that detects whether or not the predetermined face faces a charger; and
an alarm unit that notifies that the predetermined face is situated at a position inappropriate for charging when the front-back detection unit detects that the predetermined face does not face the charger, wherein
the power receiver is a power receiving coil for receiving electric power by utilization of electromagnetic induction,
the housing has a first surface serving as the predetermined face and a second surface that is opposite to the first surface,
the power receiving coil is laid along the first surface,
the electronic apparatus includes:
a magnetic shield unit that is interposed between the power receiving coil and the second surface for shielding magnetism; and
a first magnetic sensor and a second magnetic sensor serving as the front-back detection section, the first magnetic sensor being interposed between the magnetic shield unit and the first surface for detecting intensity of mag- netism, and the second magnetic sensor being interposed between the magnetic shield unit and the second surface for detecting intensity of magnetism, and the front-back detection unit detects that the first surface does not face the charger when the intensity of magnetism sensed by the second magnetic sensor is greater than intensity of the magnetism sensed by the first magnetic sensor.

7. An electronic apparatus charging system, comprising:

the electric apparatus as defined in claim 6, and the charger.

8. An electronic apparatus comprising:

a housing having a predetermined face;

a power receiver that receives electric power in a contactless manner by way of the predetermined face;

a secondary battery that is charged by electric power received by the power receiver;

a front-back detection unit that detects whether or not the predetermined face faces a charger; and an alarm unit that notifies that the predetermined face is situated at a position inappropriate for charging when the front-back detection unit detects that the predetermined face does not face the charger, wherein the power receiver is a power receiving coil for receiving electric power by utilization of electromagnetic induction, the electronic apparatus includes a first communication unit establishes communication with the charger by use of the power receiving coil and a second communication unit that establishes wireless communication with the charger, the first communication unit and the second communication unit serving as the front-back detection unit, and the front-back detection unit detects that the predetermined face does not face the charger when the first communication unit cannot establish communication with the charger and when the second communication unit can establish communication with the charger.

9. An electronic apparatus charging system, comprising:

the electric apparatus as defined in claim 8, and the charger.

10. The electronic apparatus according to claim 8, wherein the housing has a first surface serving as the predetermined face and a second surface that is opposite to the first surface, the power receiving coil is laid along the first surface, a magnetic shield unit is interposed between the power receiving coil and the second surface for shielding magnetism, and the second communication unit is exposed on the first surface and the second surface than the magnetic shield unit is.

\* \* \* \* \*